(12) United States Patent
Buttolo et al.

(10) Patent No.: US 10,112,531 B2
(45) Date of Patent: Oct. 30, 2018

(54) VEHICLE BADGE WITH IMPROVED RESOLUTION

(71) Applicant: Ford Global Technologies, LLC, Dearborn, MI (US)

(72) Inventors: Pietro Buttolo, Dearborn Heights, MI (US); Stuart C. Salter, White Lake, MI (US); Paul Kenneth Dellock, Northville, MI (US); James J. Surman, Clinton Township, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/142,669

(22) Filed: Apr. 29, 2016

(65) Prior Publication Data

US 2017/0313243 A1    Nov. 2, 2017

(51) Int. Cl.
*B60Q 1/26* (2006.01)
*B60Q 1/56* (2006.01)
*H05B 33/08* (2006.01)

(52) U.S. Cl.
CPC ........... *B60Q 1/56* (2013.01); *H05B 33/0809* (2013.01); *H05B 33/0845* (2013.01)

(58) Field of Classification Search
CPC ... B60Q 1/56; H05B 33/0809; H05B 33/0845
See application file for complete search history.

(56) References Cited

U.S. PATENT DOCUMENTS

| | | | |
|---|---|---|---|
| 5,255,170 A * | 10/1993 | Plamp | A47G 33/02 362/121 |
| 6,211,626 B1 | 4/2001 | Lys et al. | |
| 6,236,331 B1 | 5/2001 | Dussureault | |
| 7,429,965 B2 * | 9/2008 | Weiner | G06K 17/00 345/205 |
| 7,837,366 B2 | 11/2010 | King et al. | |
| 8,292,481 B2 * | 10/2012 | Gotz | F21S 41/663 362/545 |

(Continued)

FOREIGN PATENT DOCUMENTS

| | | |
|---|---|---|
| DE | 19804891 A1 | 9/1999 |
| DE | 102005037680 A1 | 2/2007 |

OTHER PUBLICATIONS

Flashingblinylights.com red mini scrolling text badges from the Wayback Machine Mar. 8, 2015 made by Flashingblinkylights, Mar. 8, 2015 capture from the WayBack Machine, red mini scrolling text badges, "https://web.archive.org/web/20150308172019/https://www.flashingblinkylights.com/red-mini-scrolling-text-led-badges-sku-no-11212.html".*

(Continued)

*Primary Examiner* — Alexander H Taningco
*Assistant Examiner* — Kurtis R Bahr
(74) *Attorney, Agent, or Firm* — Jason Rogers; Price Heneveld LLP

(57) ABSTRACT

A vehicle badge is provided herein. A first number of light sources is configured to successively illuminate, wherein at least a majority of the first number of light sources ramps to a maximum intensity within a corresponding time interval prior to a time period elapsing. A second number of light sources is configured to successively illuminate, wherein each of the second number of light sources ramps to a maximum intensity once the time period is reached.

10 Claims, 9 Drawing Sheets

(56) References Cited

U.S. PATENT DOCUMENTS

| | | | |
|---|---|---|---|
| 8,681,071 B2* | 3/2014 | Deutsch | G02B 6/006 |
| | | | 345/1.1 |
| 8,752,989 B2 | 6/2014 | Roberts et al. | |
| 8,816,586 B2 | 8/2014 | Marcove et al. | |
| 9,308,858 B2* | 4/2016 | Cho | B60Q 1/06 |
| 9,616,807 B2* | 4/2017 | Miura | B60Q 1/2661 |
| 2010/0007463 A1 | 1/2010 | Dingman et al. | |
| 2013/0141018 A1* | 6/2013 | Kamii | H05B 33/0863 |
| | | | 315/360 |
| 2014/0015420 A1 | 1/2014 | Liscinsky | |
| 2014/0184068 A1 | 7/2014 | Kwon | |
| 2015/0035432 A1* | 2/2015 | Kendall | F25D 27/005 |
| | | | 315/76 |
| 2015/0138809 A1* | 5/2015 | Salter | B60R 13/005 |
| | | | 362/510 |
| 2015/0154896 A1* | 6/2015 | Dellock | G09F 21/04 |
| | | | 362/509 |
| 2015/0158418 A1* | 6/2015 | Bingle | B60Q 1/444 |
| | | | 340/479 |
| 2015/0239390 A1* | 8/2015 | Oliverio | G07C 5/08 |
| | | | 340/461 |
| 2015/0241015 A1* | 8/2015 | Johnson | G09F 19/18 |
| | | | 362/509 |
| 2016/0243979 A1* | 8/2016 | Langkabel | H05B 33/0845 |
| 2016/0297366 A1* | 10/2016 | Dellock | B60R 1/1207 |
| 2017/0113602 A1* | 4/2017 | Salter | B60Q 1/2615 |

OTHER PUBLICATIONS vakits.com-led-crucifix-5mm from Nightfire Electronics from the Wayback Machine Oct. 21, 2015 made by Nightfire Electronics, Oct. 21, 2015 capture from the Wayback Machine, LED Cross Crucifix 5MM sold by vakits, "https://web.archive.org/web/20151021025341/http://vakits.com/led-crucifix-5mm".*

* cited by examiner

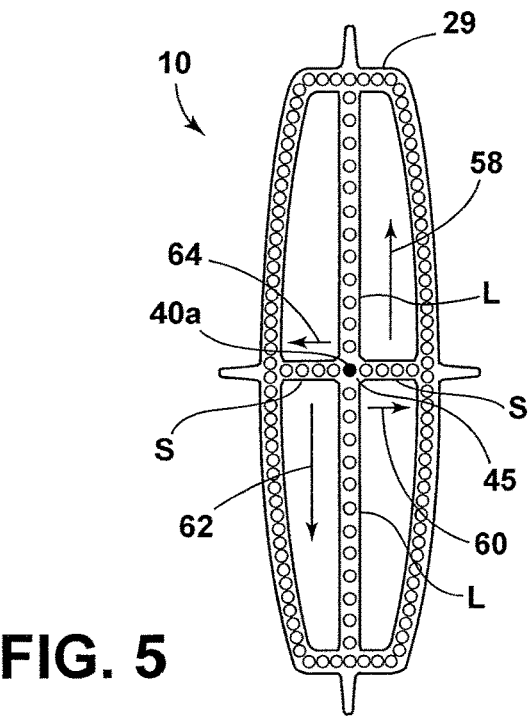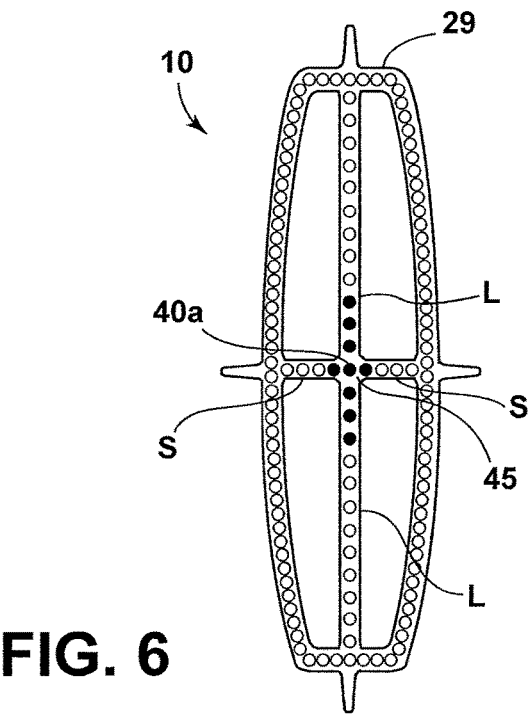
FIG. 5    FIG. 6
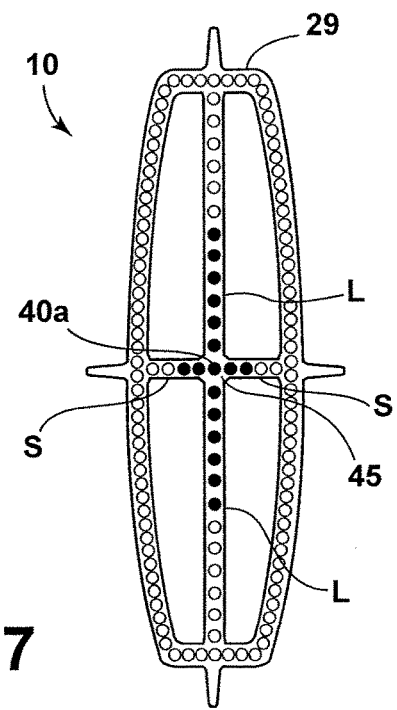
FIG. 7

VEHICLE BADGE WITH IMPROVED RESOLUTION

FIELD OF THE DISCLOSURE

The present disclosure generally relates to vehicle badges, and more particularly, to vehicle badges operable to illuminate.

BACKGROUND OF THE DISCLOSURE

Some vehicle badges employ a number of light sources to effectuate a variety of lighting effects. As such, a need arises to improve the resolution of said badges.

SUMMARY OF THE DISCLOSURE

According to one aspect of the present disclosure, a vehicle badge is provided. A first number of light sources is configured to successively illuminate, wherein at least a majority of the first number of light sources ramps to a maximum intensity within a corresponding time interval prior to a time period elapsing. A second number of light sources is configured to successively illuminate, wherein each of the second number of light sources ramps to a maximum intensity once the time period is reached.

According to another aspect of the present disclosure, a vehicle badge is provided. A first number of light sources is configured to successively illuminate, wherein at least a majority of the first number of light sources ramps to a maximum intensity within a corresponding time interval prior to a time period elapsing. A second number of light sources is configured to successively illuminate, wherein each of the second number of light sources ramps to a maximum intensity prior to the time period elapsing.

According to yet another aspect of the present disclosure, a method is provided. A badge is provided having a first number of light sources and a second number of light sources. The first number of light sources is successively activated such that at least a majority of the first number of light sources ramps to a maximum intensity within a corresponding time interval prior to a time period elapsing. The second number of light sources is successively activated such that each of the first number of light sources ramps to a maximum intensity prior to the time period elapsing.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIGS. 5-10 illustrate a lighting sequence of the badge according to one embodiment;

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to an illuminated badge that may be attached to a vehicle. The disclosure is also related to a system and method for calibrating the badge in order to reproduce a desired lighting sequence.

Figure 1:
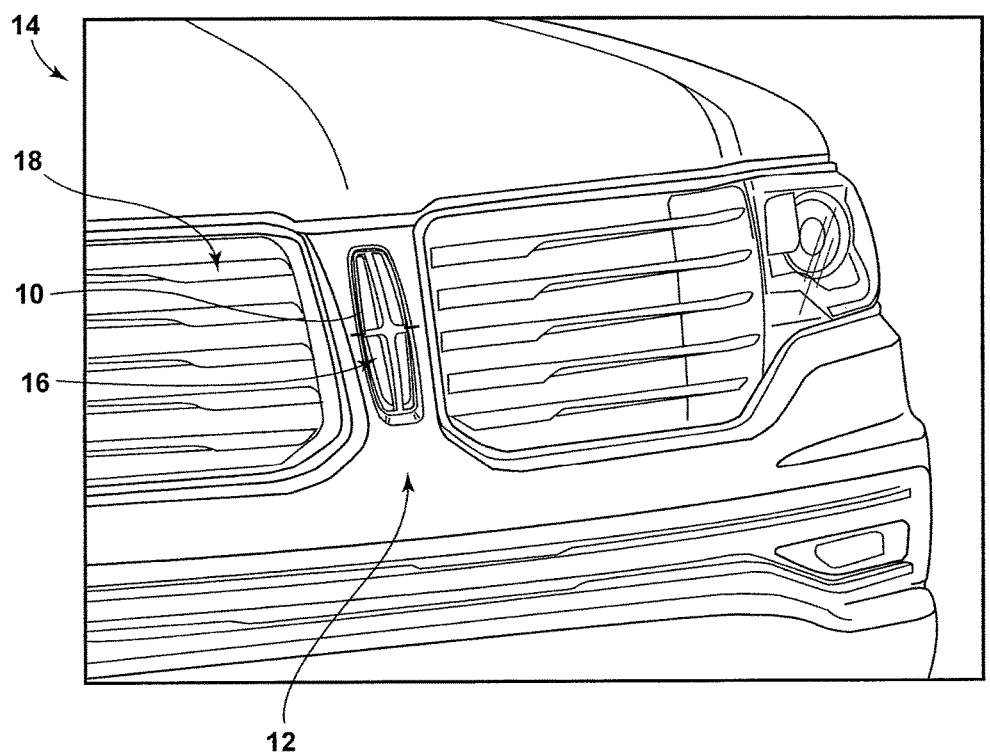
FIG. 1 is a front perspective view of a vehicle equipped with an illuminated badge on a grille assembly of a vehicle, according to one embodiment.

Referring now to FIG. 1, a badge 10 is generally shown mounted on a front portion 12 of a vehicle 14. In other embodiments, the badge 10 may be located elsewhere, such as, but not limited to, other locations of the front portion 12, a side portion, or a rear portion of the vehicle 14. Alternatively, the badge 10 may be disposed inside the vehicle 14. The badge 10 may be configured as an insignia that is presented as an identifying mark of a vehicle manufacturer and includes a viewable portion 16 that is generally prominently displayed on the vehicle 14. In the presently illustrated embodiment, the badge 10 is centrally located on a grille assembly 18 of the vehicle 14, thus allowing the badge 10 to be readily viewed by an observer looking head-on at the vehicle 14. As will be described below in greater detail, one or more light sources may be disposed within the badge 10 and may illuminate portions of the viewable portion 16 to provide a distinct styling element to the vehicle 14.

Figure 2:
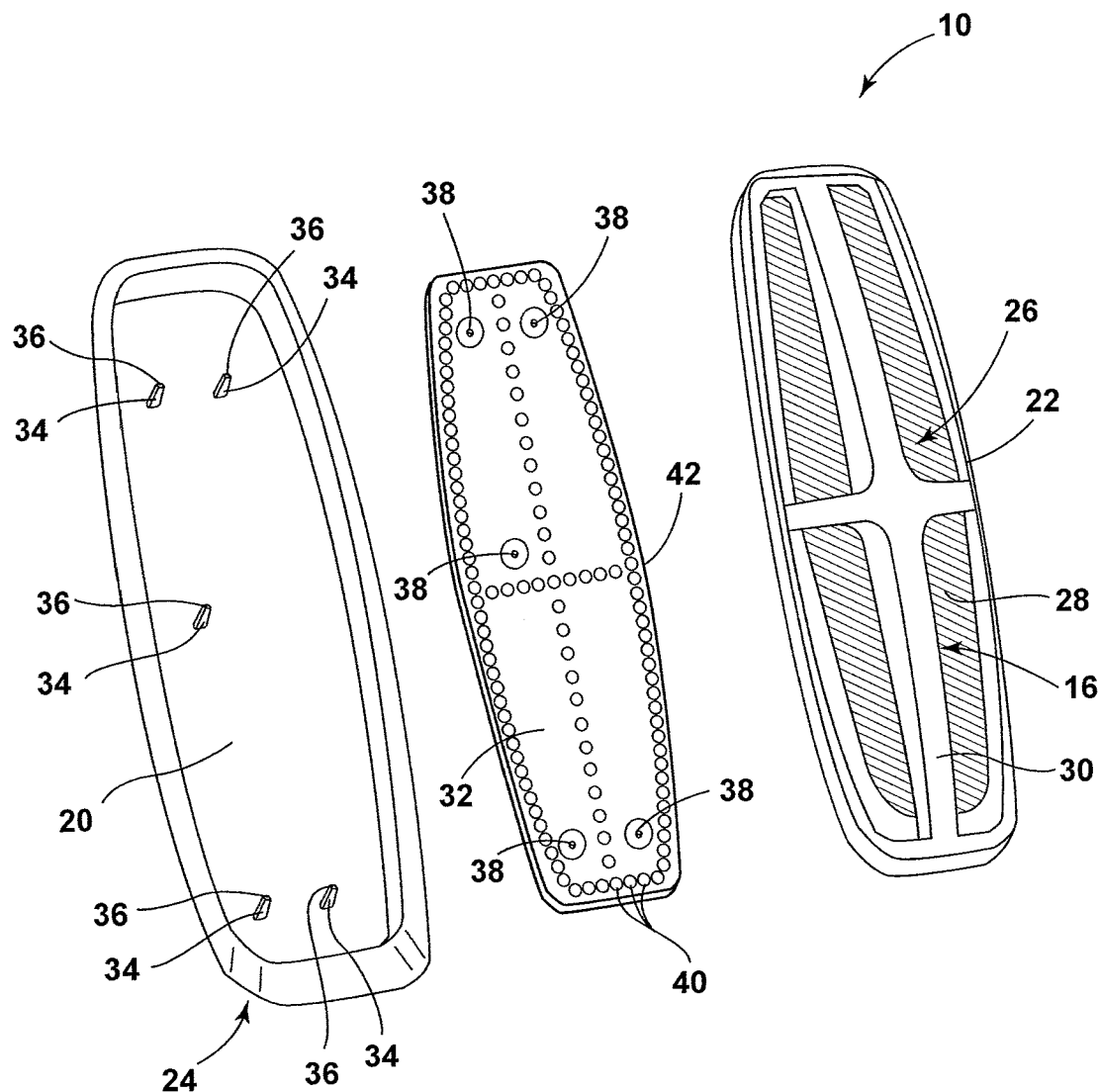
FIG. 2 is an exploded view of the badge, according to one embodiment.

Referring to FIG. 2, the badge 10 is shown, according to one embodiment, having a substrate 20 that may be attached to a housing 22. The substrate 20 may form a rear portion 24 of the badge 10 and may be capable of being secured to the vehicle 14 via any suitable means known in the art. The housing 22 may include the viewable portion 16 centrally located on a forward portion 26 thereof. The viewable portion 16 may include a background region 28 and insignia 29. The insignia 29 may signify the make, model, or any other information that may be desirable to confer about the vehicle 14 upon which the badge 10 is attached to. The viewable portion 16 may include a transparent and/or translucent portion and one or more substantially opaque portion(s), which may be configured as opaque coatings applied to the viewable portion 16. In some embodiments, some, or all, of the viewable portion 16 may be left open to the front portion 12 of the vehicle 14. According to one embodiment, the background region 28 may be opaque or light-blocking whereas the portion associated with the insignia 29 is light-transmissive. As shown, the insignia 29 includes a rim portion 30 and a cross-portion defined by a long arm L and a short arm S.

According to one embodiment, the housing 22 and/or the substrate 20 may be constructed from a rigid material such as, but not limited to, a polymeric material and may be assembled to one another via sonic welding, laser welding, vibration welding, injection molding, or any other process known in the art. Alternatively, the housing 22 and the substrate 20 may be assembled together via the utilization of adhesives and/or fasteners. Alternatively still, the housing 22 and substrate 20 may be integrally formed as a single component.

With further reference to FIG. 2, a printed circuit board (PCB) 32 may be secured between the substrate 20 and housing 22. According to one embodiment, the substrate 20 includes a plurality of raised platform 34. A fastener hole 36 is defined in each platform 34 and a plurality of corresponding through holes 38 is defined by the PCB 32. Accordingly, a plurality of complimentary mechanical fasteners (not shown) may be inserted through the through holes 38 of the PCB 32 and mechanically engaged to the fastener holes 36 for removably fixing the PCB 32 to the substrate 20.

Figure 3:
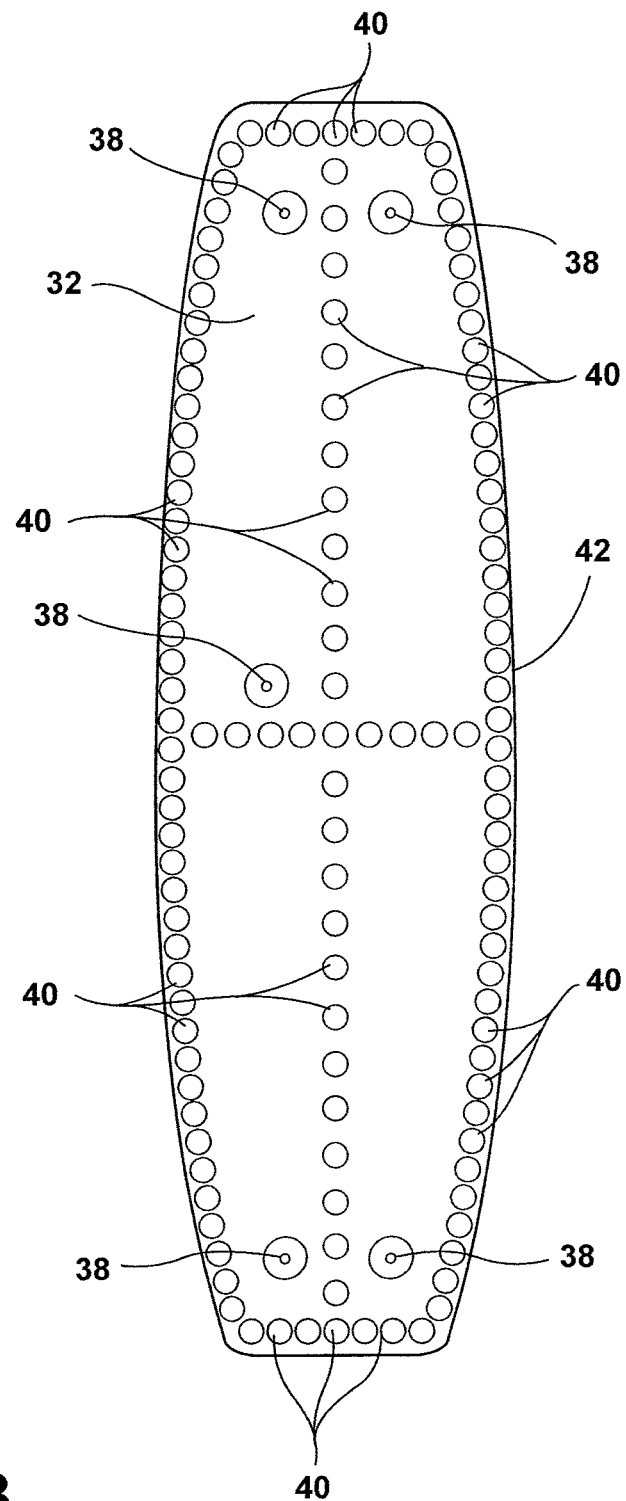
FIG. 3 is a front perspective view of a printed circuit board disposed within the badge having a plurality of light sources thereon, according to one embodiment.

Referring to FIGS. 2 and 3, the PCB 32 may have a plurality of light sources 40 disposed thereon in a variety of patterns. The light sources 40 may include any form of light source. For example, fluorescent lighting, light emitting diodes (LEDs), organic LEDs (OLEDs), polymer LEDs (PLEDs), solid state lighting, or any other form of lighting configured to emit light may be utilized. In some embodiments, a reflective (e.g., white) solder mask may be applied to the PCB 32 to reflect light incident thereon. In the present embodiment, the light sources 40 are arranged to compliment the shape of the insignia 29 and are oriented to illuminate the insignia 29. More specifically, a portion of the light sources 40 are spaced about a peripheral edge 42 of the PCB 32 to coincide with the rim portion 30 portion of the insignia 29 while another portion of the light sources 40 are spaced vertically and horizontally across the PCB 32 to coincide with the long arm L and the short arm S of the insignia, respectively. In operation, the light sources 40 may each be independently activated to emit light in a variety of colors at variable intensity. The light sources 40 may be activated concurrently or at different time intervals to exhibit different lighting effects.

Figure 4:
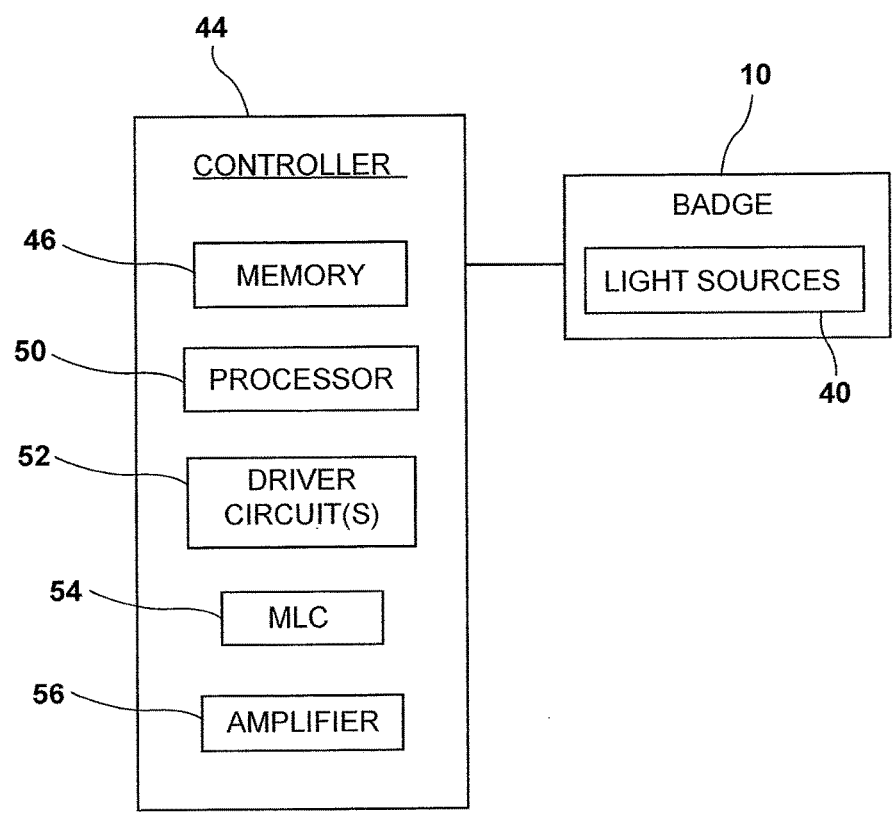
FIG. 4 illustrates a controller for operating the plurality of light sources.
Figure 8:
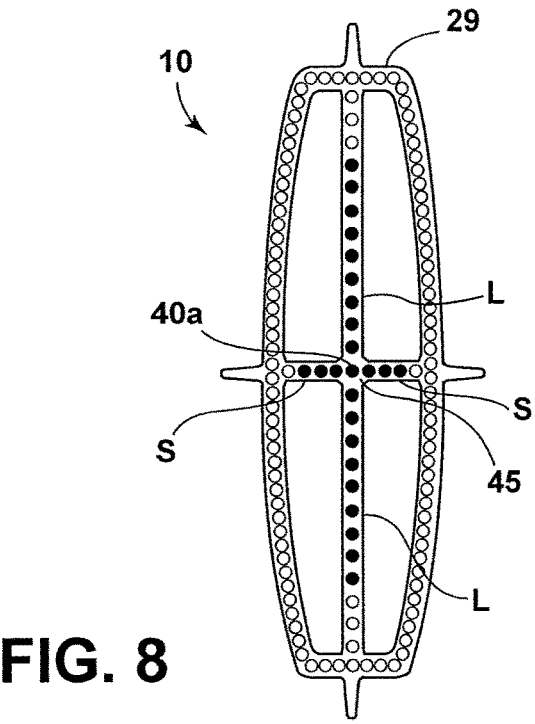

Referring to FIG. 4, a controller 44 is operably coupled to the badge 10 and is configured to independently control an activation state of each of the light sources 40. The controller 44 may be located on the PCB 32 or disposed elsewhere in the vehicle 14. The controller 44 includes a memory 46 having instructions stored thereon that are executable by a processor 50 for controlling the light sources 40. The controller 44 may also include one or more driver circuits 52 operably coupled to the light sources 40. According to one embodiment, the controller 44 includes a master level controller (MLC) 54, which may be embodied as either a MOSFET or a transistor and is connected in series with each driver circuit 52. In operation, the MLC 54 may control the overall intensity levels of the light sources 40 and provide for better resolution. For example, if using software implemented pulse width modulations to control the light intensity of the light sources 40, the pulse width modulations are generally limited by the clock rate of the processor 50, which itself is limited by power consumption. In such a scenario, it is typical to achieve 50 equally spaced voltage levels and possibly 255 voltage levels in a best case scenario. However, since the perception of light intensity is logarithmic, of the 50 voltage levels, for example, only the first few voltage levels will introduce a perceivable difference, thus resulting in poor resolution. By employing the master level controller 54, square resolution is achievable. Accordingly, if 50 voltage levels were previously available via pulse width modulations, the inclusion of the MLC 54 would provide 2,500 voltage levels. As a result, one may achieve smaller increments at lower intensity levels and larger increments at higher intensity levels, thereby improving the resolution of the badge 10. In an alternative embodiment, the MLC 54 is omitted in favor of an amplifier 56 disposed at the output of each driver circuit 52. The amplifier 56 may be exponential or logarithmic and enables the light sources 40 to exhibit increased ramp up at higher intensities and decreased ramp up at lower intensities to improve resolution.

Referring to FIGS. 5-10, a lighting sequence of the badge 10 is shown according to one embodiment. For purposes of illustration, the light sources 40 are visibly shown through the insignia 29 of the badge 10. However, it should be understood that the insignia 29 may be configured to generally obstruct the view of the light sources 40. For example, the insignia 29 may include a light-transmissive metallized layer to impart a metallic appearance thereto. The lighting sequence may begin by first activing light source 40a to illuminate a central area 45 of the insignia 29, which corresponds to the point of intersection between the long arm L and the short arm S of the insignia, as shown in FIG. 5. Next, as shown in FIGS. 6-9, the remaining light sources 40 associated with the long arm L and the short arm S of the insignia 29 are sequentially activated to ramp to a maximum intensity in an outward direction stemming from light source 40a. For example, a first number of light sources 40 coinciding with an upward-extending portion of the long arm L are sequentially activated in the direction specified by arrow 58. Also, a second number of light sources 40 coinciding with a rightward-extending portion of the short arm S are sequentially activated in the direction specified by arrow 60. Further, a third number of light sources 40 coinciding with a downward-extending of the long arm L are sequentially activated in the direction specified by arrow 62, which is opposite to the direction specified by arrow 58. Lastly, a fourth number of light sources 40 coinciding with a leftward-extending portion of the short arm S are sequentially activated in the direction specified by arrow 64, which is opposite to the direction specified by arrow 60. With respect to the embodiments described herein, the first and third number of light sources 40 is equal in number (e.g., 12). The second and fourth number of light sources 40 is less than the first and third number of light sources 40 and is also equal in number (e.g., 4).

Figure 9:
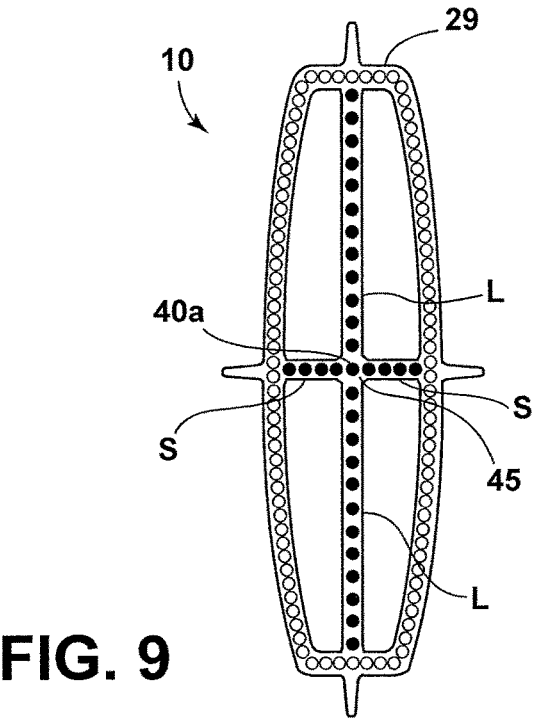
Figure 10:
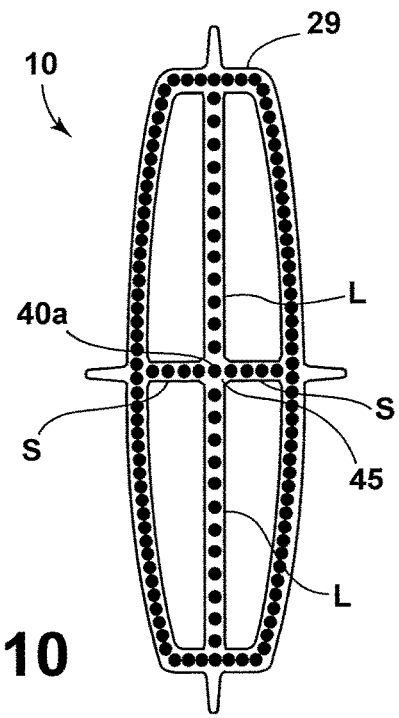

In operation, the first, second, third, and fourth number of light sources 40 are activated in a synchronized manner such that the long arm L and the short arm S of the insignia 29 are fully illuminated once a time period has been reached. In the present embodiment, the ratio between the light sources 40 associated with the long arm L and the short arm S is 3 to 1. Thus, to impart synchronicity, for every one light source 40 associated with the short arm S that becomes activated, three light sources 40 associated with the long arm L are also activated. Once the long arm L and the short arm S have become fully illuminated, as shown in FIG. 9, the rim portion 30 of the insignia 29 may be illuminated by simultaneously activating the light sources 40 associated therewith, as shown in FIG. 10, thereby completing the lighting sequence.

Figure 11:
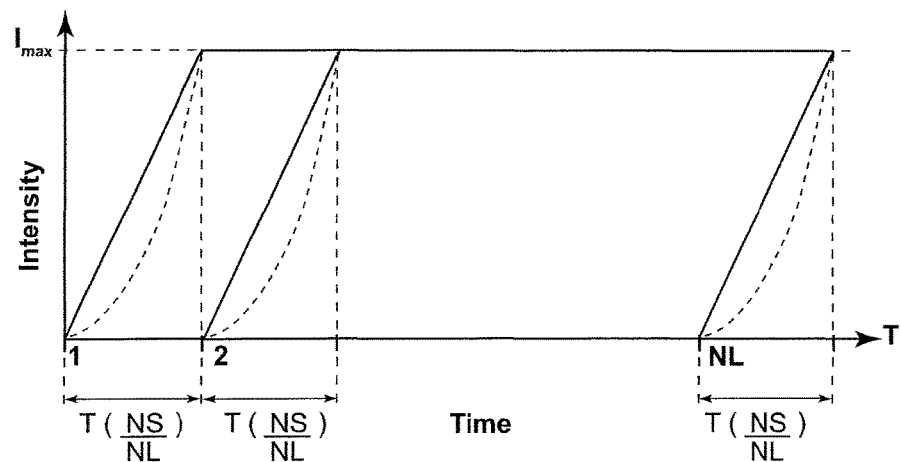
FIG. 11 is a graph illustrating a ramp up for a first number of light sources according to one embodiment.

Referring to FIG. 11, a graph is shown illustrating the ramp up for the first number of light sources 40 according to one embodiment. It should be understood that the ramp up for the third number of light sources 40 may share the same characteristics. As shown, each of the first number of light sources 40, numbered in numerical order from 1 to NL, is successively activated, beginning with the light source 40 adjacent light source 40a (e.g., light source 1), and ramps, either linearly or exponentially, to a maximum intensity $I_{max}$ within a corresponding time interval prior to a time period T elapsing. According to the present embodiment, the ramps of each of the first number of light sources 40 do not overlap and the time interval is defined by the following relationship:

$$T\frac{NS}{NL}$$

where NL is the first number of light sources 40 and NS is either the second or fourth number of light sources 40. While the graph has been described in reference to the first number of light sources 40, it is to be understood that the graph may also be representative of the third number of light sources 40. Likewise, the time intervals associated with the third number of light sources 40 may be similarly determined.

Figure 12:
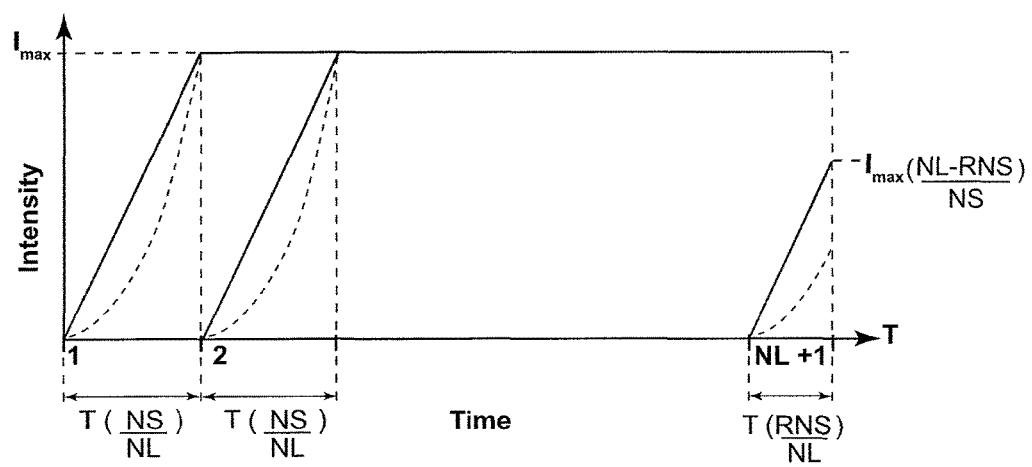
FIG. 12 is a graph illustrating the ramp up for the first number of light sources according to an alternative embodiment.

In instances where the ratio between NL and NS is not an even integer, the time interval associated with the last light source 40 (e.g., light source NL+1, FIG. 11) to be illuminated may be based on a remainder, as shown in FIG. 12. For example, the ratio between NL and NS is defined by the following equation:

$$\frac{NL}{NS} = R + \frac{NL - RNS}{NS}$$

where R is the ratio between NL and NS and NL-RNS is the remainder. Accordingly, the time interval for the last light source 40 to be illuminated may be defined by the following relationship:

$$T\frac{NL - RNS}{NL}$$

Also, in instances where the ratio R between NL and NS is not an even integer, the intensity of the last light source 40 may be defined by the following relationship:

$$I_{max}\frac{NL - RNS}{NS}$$

Figure 13:
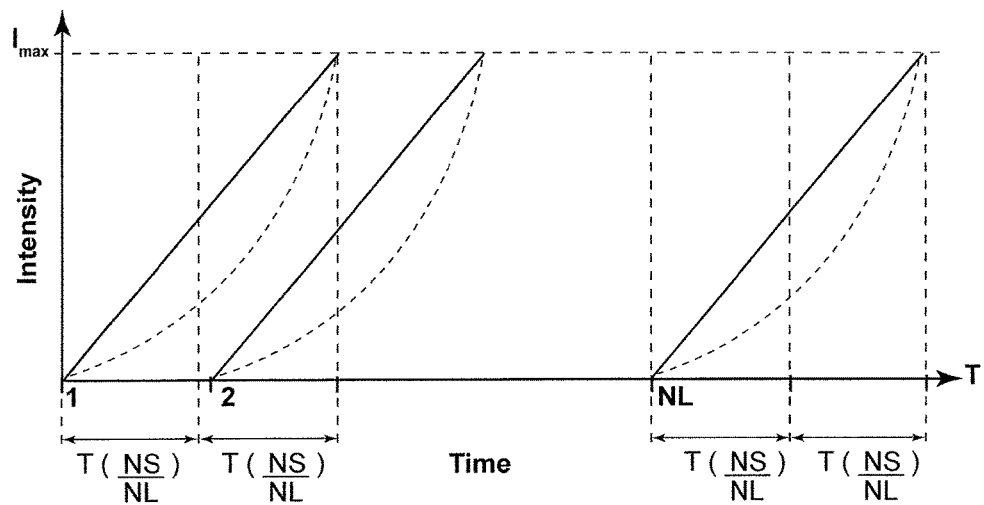
FIG. 13 is a graph illustrating the ramp up for the first number of light sources according to yet another embodiment.

While the ramp up of the first number of light sources 40 has been shown in FIGS. 11 and 12 as having no overlap, it is to be understood that some overlap may occur in alternative embodiments. For example, in FIG. 13, a graph is shown illustrating the ramp up for the first number of light sources 40 according to an alternative embodiment. As shown, each of the first number of light sources 40, numbered in numerical order from 1 to NL, is successively activated, beginning with the light source 40 (e.g., light source 1) adjacent light source 40a, and ramps, either linearly or exponentially, to the maximum intensity $I_{max}$. With respect to the present embodiment, each of the light sources 40 ramps to a fraction of the maximum intensity $I_{max}$ within the corresponding time interval, as calculated previously with reference to the embodiment of FIG. 11. For example, each of the light sources 40 ramps to approximately 50% by the time the corresponding time interval lapses. As a result, overlap occurs between the ramps of adjacent light sources 40. The ramp up of the third number of light sources 40 may be similarly configured. If the ratio between NL and NS is not an even integer, the time interval and intensity for the last light source 40 may be calculated in the same manner shown in FIG. 12 for light source NL+1.

Figure 14:
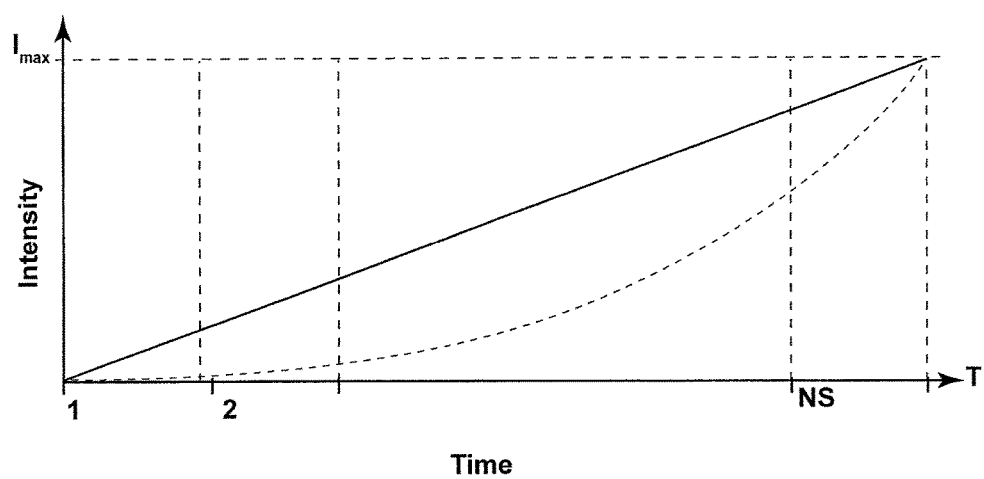
FIG. 14 is a graph illustrating the ramp up for a second number of light sources according to one embodiment.
Figure 15:
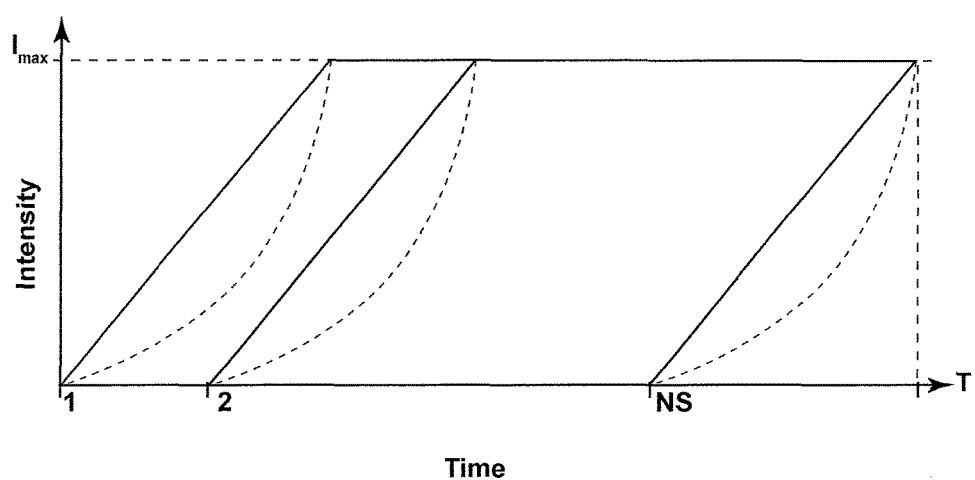
FIG. 15 is a graph illustrating the ramp up for the second number of light sources according to an alternative embodiment.

Referring to FIG. 14, a graph is shown illustrating the ramp up for the second number of light sources 40 according to one embodiment. It should be understood that the ramp up for the fourth number of light sources 40 may share the same characteristics. As shown, each of the second number of light sources 40, numbered in numerical order from 1 to NS, is successively activated, beginning with the light source 40 adjacent light source 40a (e.g., light source 1), and ramps, either linearly or exponentially, to the maximum intensity $I_{max}$ once the time period T is reached. With respect to the present embodiment, each of the light sources 40 is activated to conform to a homogenous ramp up, as shown in FIG. 14. Alternatively, as shown in FIG. 15, instead of sharing a homogenous ramp up, each of the second number of light sources 40, numbered in numerical order from 1 to NS, may be successively activated, beginning with the light source 40 adjacent light source 40a (e.g., light source 1), and ramps, either linearly or exponentially, to the maximum intensity $I_{max}$ within a corresponding time interval prior to the time period T elapsing. The time interval may be variously selected such that the ramps of the light sources 40 exhibit overlap or no overlap.

It important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle badge comprising:
   a housing comprising a viewable portion defined by an opaque region, a light-transmissive insignia having a long arm and a short arm, and a light-transmissive rim portion, wherein the opaque region is bounded by the long arm, the short arm, and the rim portion, the insignia extending forwardly of the opaque region;
   a printed circuit board coupled to a substrate and located behind the housing; and
   a plurality of light sources disposed on the printed circuit board to complement the shape of the insignia and comprising:
      a first number of light sources extending in a vertical direction to coincide with the long arm of the insignia; and
      a second number of light sources extending in a horizontal direction to coincide with the short arm of the insignia, wherein the first and second number of light sources are configured to sequentially activate in an outward direction stemming from one of the plurality of light sources, and wherein the first number of light sources is greater than the second number of light sources.

2. The vehicle badge of claim 1, wherein the first and second number of light sources become fully activated at the same time.

3. The vehicle badge of claim 2, wherein when the first and second number of light sources have become fully activated, light sources disposed about a peripheral edge of the printed circuit board are then activated, and wherein the light sources coincide with a rim portion of the insignia.

4. The vehicle badge of claim 1, wherein each of the first and second number of light sources are configured to ramp to a maximum intensity.

5. The vehicle badge of claim 4, wherein the ramps of the first number of light sources are one of overlapping and non-overlapping and the ramps of the second number of light sources collectively define a homogenous ramp up.

6. The vehicle badge of claim 4, wherein the ramps of each of the first and second number of light sources is one of linear and exponential.

7. The vehicle badge of claim 1, further comprising at least one driver circuit operably coupled to the first and second number of light sources, and one of a transistor and a MOSFET connected in series with the at least one driver circuit.

8. The vehicle badge of claim 1, further comprising at least one driver circuit operably coupled to the first and second number of light sources, and one of a logarithmic and an exponential amplifier disposed at an output of the at least one driver circuit.

9. A vehicle badge comprising:
   a housing comprising a viewable portion defined by an opaque region, a light-transmissive insignia having a long arm and a short arm, and a light-transmissive rim portion, wherein the opaque region is bounded by the long arm, the short arm, and the rim portion, the insignia extending forwardly of the opaque region;
   a first number of light sources extending in a vertical direction to coincide with the long arm of the insignia;
   a second number of light sources extending in a horizontal direction to coincide with the short arm of the insignia, wherein the first and second number of light sources are configured to sequentially activate in an outward direction stemming from one of the first or second number of light sources; and
   a driver circuit operably coupled to the first and second number of light sources and one of a transistor and a MOSFET connected in series with the at least one driver circuit.

10. A vehicle badge comprising:
    a housing comprising a viewable portion defined by an opaque region, a light-transmissive insignia having a long arm and a short arm, and a light-transmissive rim portion, wherein the opaque region is bounded by the long arm, the short arm, and the rim portion, the insignia extending forwardly of the opaque region;
    a first number of light sources extending in a vertical direction within the long arm;
    a second number of light sources extending in a horizontal direction within the short arm, wherein the first and second number of light sources are configured to sequentially activate in an outward direction stemming from one of the first or second number of light sources; and
    a driver circuit operably coupled to the first and second number of light sources and one of a logarithmic and an exponential amplifier disposed at an output of the at least one driver circuit.

* * * * *